United States Patent
Saito

(10) Patent No.: US 9,873,402 B2
(45) Date of Patent: Jan. 23, 2018

(54) AIRBAG

(71) Applicant: NIHON PLAST CO., LTD., Shizuoka (JP)

(72) Inventor: Chiari Saito, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 14/748,348

(22) Filed: Jun. 24, 2015

(65) Prior Publication Data
US 2015/0375707 A1 Dec. 31, 2015

(30) Foreign Application Priority Data
Jun. 26, 2014 (JP) .................................. 2014-131762

(51) Int. Cl.
*B60R 21/239* (2006.01)
*B60R 21/2338* (2011.01)

(52) U.S. Cl.
CPC .... *B60R 21/239* (2013.01); *B60R 2021/2395* (2013.01); *B60R 2021/23382* (2013.01); *B60R 2021/23384* (2013.01)

(58) Field of Classification Search
CPC .......... B60R 21/239; B60R 2021/2395; B60R 2021/23384; B60R 2021/23382
See application file for complete search history.

(56) References Cited

U.S. PATENT DOCUMENTS

| | | | | |
|---|---|---|---|---|
| 6,832,778 B2* | 12/2004 | Pinsenschaum | ...... | B60R 21/233 280/739 |
| 7,192,053 B2* | 3/2007 | Thomas | ................ | B60R 21/233 280/739 |
| 7,607,690 B2* | 10/2009 | Abe | ...................... | B60R 21/231 280/739 |
| 7,784,828 B2* | 8/2010 | Matsu | ................... | B60R 21/233 280/739 |
| 7,857,347 B2* | 12/2010 | Abe | ..................... | B60R 21/2338 280/729 |
| 7,878,538 B2* | 2/2011 | Abe | ..................... | B60R 21/2338 280/736 |
| 8,020,891 B2* | 9/2011 | Fukawatase | ........ | B60R 21/2338 280/739 |

(Continued)

FOREIGN PATENT DOCUMENTS

JP 2010-116010 A 5/2010

*Primary Examiner* — Paul N Dickson
*Assistant Examiner* — Timothy Wilhelm
(74) *Attorney, Agent, or Firm* — Brundidge & Stanger, P.C.

(57) ABSTRACT

An airbag is disclosed which allows for stable and easy adjustment of the degree of opening of a discharge hole with a simple configuration. The airbag includes: a variable discharge vent hole in at least one of paired lateral surfaces facing each other; and a cover at a position of an outer portion of an airbag main body to be placed over the variable vent hole. In addition, a first end of a tether is connected to the cover corresponding to a first one of the paired lateral surfaces. A second end of the tether is connected in the airbag main body to a second one of the paired lateral surfaces that is positioned opposite to the first one of the paired lateral surfaces including the variable vent hole corresponding to the lid.

2 Claims, 6 Drawing Sheets

(56) References Cited

U.S. PATENT DOCUMENTS

| | | | | |
|---|---|---|---|---|
| 8,191,925 B2* | 6/2012 | Williams | ............ | B60R 21/2338 |
| | | | | 280/739 |
| 8,226,118 B2* | 7/2012 | Rose | ................... | B60R 21/2338 |
| | | | | 280/743.2 |
| 8,646,808 B2* | 2/2014 | Williams | .............. | B60R 21/239 |
| | | | | 280/739 |
| 8,684,407 B2* | 4/2014 | Fischer | ............... | B60R 21/2338 |
| | | | | 280/739 |
| 8,870,223 B2* | 10/2014 | Choi | ................... | B60R 21/2338 |
| | | | | 280/739 |
| 9,108,590 B2* | 8/2015 | Williams | ............. | B60R 21/239 |
| 9,150,189 B1* | 10/2015 | Nelson | ................ | B60R 21/2338 |
| 9,187,058 B2* | 11/2015 | Yamaji | .................. | B60R 21/205 |
| 9,216,712 B1* | 12/2015 | Kwon | .................. | B60R 21/2338 |
| 9,327,674 B2* | 5/2016 | Fischer | ................. | B60R 21/239 |
| 2010/0001498 A1* | 1/2010 | Abe | .................... | B60R 21/2338 |
| | | | | 280/739 |
| 2010/0133798 A1 | 6/2010 | Fukawatase et al. | | |

\* cited by examiner

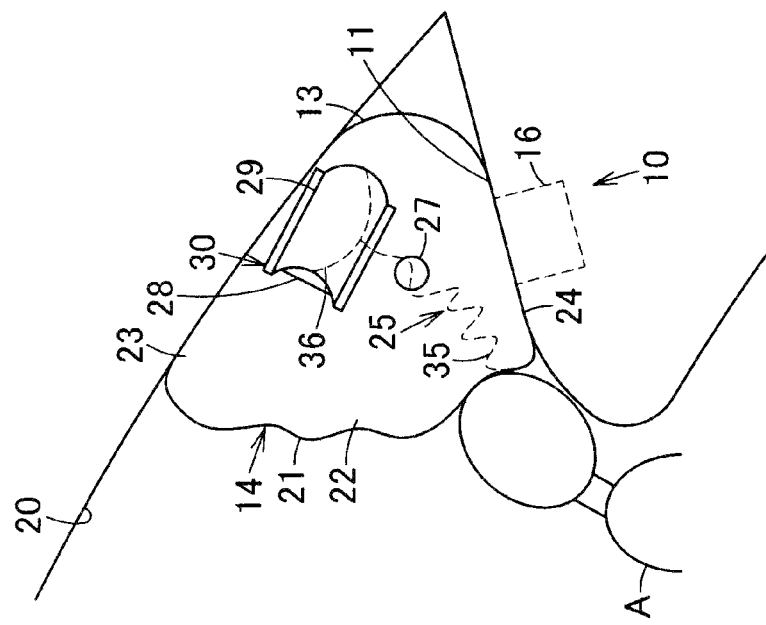
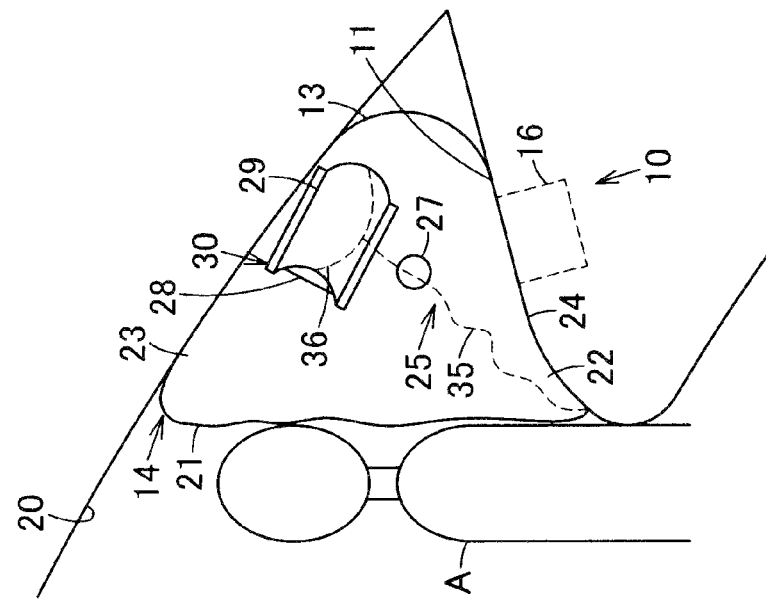

AIRBAG

CROSS REFERENCE TO RELATED APPLICATION

This application is entitled to the benefit of Japanese Patent Application No. 2014-131762 filed on Jun. 26, 2014, the disclosure of which including the specification, drawings and abstract is incorporated herein by reference in its entirety.

TECHNICAL FIELD

The present invention relates to an airbag including a sac-like airbag main body configured to inflate and deploy from a folded state by an introduced gas.

BACKGROUND ART

Heretofore, front-passenger seat airbag devices to be installed at instrument panels of automobiles have been known, for example. Such an airbag device includes an airbag having: an inflator configured to supply a gas; and a sac-like airbag main body housed while being folded in a predetermined shape. In a collision of an automobile, for example, the inflator supplies a gas to the airbag, and the airbag main body inflates and deploys in front of the passenger seated on the front-passenger seat, thereby mitigating the impact on the passenger.

There is a known configuration for such an airbag, which includes: lids covering, for example, discharge holes formed respectively in two lateral surfaces, that is, vent holes; and tethers serving as connection members each having one end that is connected to a corresponding one of the lids and a second end that is connected to a rear surface side of a center portion of a passenger restraining surface for restraining the passenger. In this configuration, the lids pulled by the tethers according to how the passenger is restrained switch between the opening and closing of the vent holes, thereby adjusting the internal pressure of the airbag main body. In addition, the robustness in misalignment of the restraint position at the passenger restraining surface is improved by partially intersecting the tethers (see, e.g., Patent Literature (hereinafter, referred to as "PTL") 1.

CITATION LIST

Patent Literature

PTL 1
Japanese Patent Application Laid-Open No. 2010-116010
(pages 6 to 9 and FIGS. 1 through 5)

SUMMARY OF INVENTION

Technical Problem

In the configuration disclosed in PTL 1, the opening and closing of the vent holes are adjusted according to the behavior of the passenger. For this reason, when the passenger is restrained at a normal restraint position with respect to the passenger restraining surface, for example, the internal pressure (reaction force) of the airbag main body may decrease when the tethers go slack and the vent holes open, that is, the opening and closing of the vent holes are easily affected by the physical size of the passenger and/or an input angle for restraint. Accordingly, there is a demand for a configuration for more stably and easily adjusting the opening and closing of vent holes.

The present invention has been made taking the above mentioned points into consideration and aims to provide an airbag that allows for stable and easy adjustment of the degree of opening of a discharge hole with a simple configuration.

Solution to Problem

An airbag according to a first aspect includes: an airbag main body including: paired opposite surfaces facing each other; and a passenger restraining surface that is positioned between the paired opposite surfaces while facing a passenger and that is capable of restraining the passenger, the airbag main body having a sac-like shape and being configured to inflate and deploy from a folded state by an introduced gas; a discharge hole included in at least one of the paired opposite surfaces; a lid attached to a position of an outer portion of the airbag main body to be placed over the discharge hole; and a connection member having a first end and a second end, the first end being connected to the lid corresponding a first one of the paired opposite surfaces, the second end being connected in the airbag main body to a second one of the paired opposite surfaces that is positioned opposite to the first one of the paired opposite surfaces which includes the discharge hole corresponding to the lid, the connection member being configured to be pulled by the second one of the paired opposite surfaces in accordance with inflation and deployment of the airbag main body to provide tension to the lid, thereby changing the degree of opening of the discharge hole.

An airbag according to a second aspect is the airbag according to the first aspect in which the connection member includes: a connection portion having two ends that are connected to the lid while crossing the discharge hole; and a connection member main body having a first end and a second end, the first end being connected to the connection portion movably along the connection portion, the second end being connected in the airbag main body to the second one of the paired opposite surfaces that is positioned opposite to the first one of the paired opposite surfaces.

Advantageous Effects of Invention

With the airbag according to the first aspect, the degree of opening of a discharge hole can be stably and easily adjusted with a simple configuration because the connection member is pulled by the opposite surface in accordance with inflation and deployment of the airbag main body and provides tension to the lid regardless of the physical size of a passenger restrained at the passenger restraining surface positioned between the paired opposite surfaces facing each other, and/or an input angle for restraint.

With the airbag according to the second aspect, in addition to obtaining the operational effects of the airbag according to claim 1, regardless of the angle at which the connection member main body is pulled, the first end of the connection member main body can move along the connection portion and keep the connection with the connection portion, which makes it possible to surely provide tension to the lid via the connection portion.

BRIEF DESCRIPTION OF DRAWINGS

FIGS. 5A and 5B illustrate deployment behavior of an airbag main body when the passenger of the airbag is at LRD evaluation positions; specifically, FIG. 5A schematically illustrates deployment behavior of the airbag main body at a first LRD evaluation position, and FIG. 5B schematically illustrates deployment behavior of the airbag main body at a second LRD evaluation position;

DESCRIPTION OF EMBODIMENTS

Figure 1:
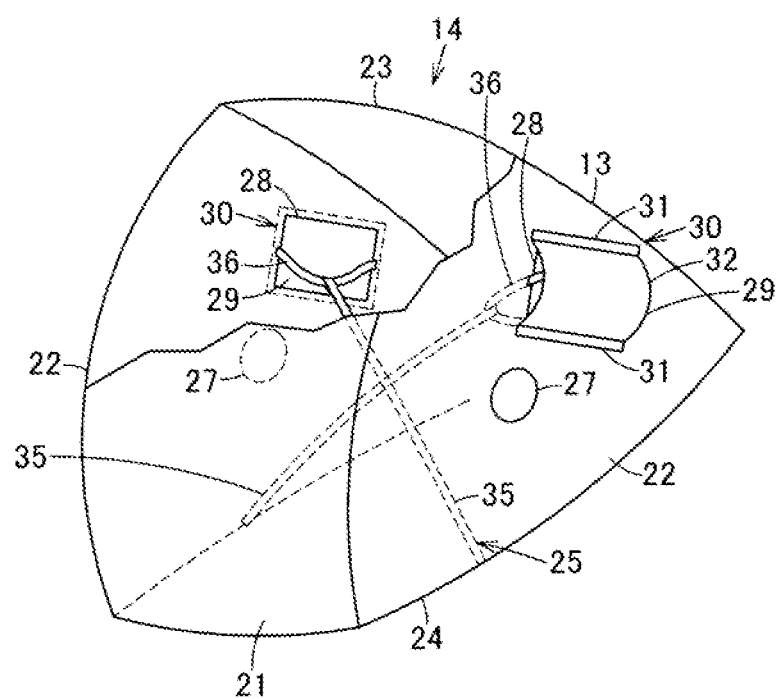
FIG. 1 is a perspective view illustrating from rearward an airbag according to a first embodiment of the present invention.

Hereinafter, a description will be given of an airbag according to a first embodiment of the present invention with reference to the accompanying drawings.

In FIGS. 1 through 6, reference numeral 10 denotes an airbag device. Airbag device 10 is placed at an inner side of instrument panel 11 serving as an installation member positioned in front of passenger A as a protection member. Stated differently, airbag device 10 is a front-passenger seat airbag. Hereinafter, the front and rear direction, lateral direction, and up and down direction are described with the forward direction of an automobile in which airbag 10 is installed, as the basis. In the drawings, passenger A is illustrated as a dummy.

Airbag device 10 may be called an airbag module. Airbag device 10 includes: airbag 14 having airbag main body 13, which is a sac-like outer portion made of foundation cloth; an inflator configured to supply a gas to airbag main body 13 (not illustrated); case body 16 to which airbag 14 and the inflator and/or the like are installed; a retainer (not illustrated); a cover member that covers airbag 14 before deployment; and a controller configured to control an operation of the inflator (not illustrated). Moreover, airbag device 10 is installed at installment panel 11 of an automobile and is electrically connected to a controller including a sensor, for example.

Case body 16 is formed substantially in a box shape. The upper side of case body 16 towards windshield 20, which extends above the front surface side of case body 16 or installment panel 11, is a rectangular opening for protrusion. The inside of case body 16 is an airbag housing portion for housing folded airbag main body 13 (airbag 14). An installation hole for installing the inflator is formed in the bottom of case body 16. The rectangular opening for protrusion is normally covered by the cover member.

The inflator includes a disc-shape main body, for example. A square-plate flange portion is formed in a protruding manner at a lower position in the height direction of the main body. Through holes are formed at the four corners of the flange portion. In addition, multiple gas injection orifices (not illustrated) are formed in the outer circumferential surface of the main body, which is positioned above the flange portion. An ignitor and a chemical agent are stored inside the main body. The ignitor causes the chemical agent to burn by an electrical signal transmitted from the controller via a connector connected to the bottom of the main body, and thereby quickly supplies an inflation gas from the gas injection orifices. This inflator is installed at the bottom of case body 16 while the main body including the gas injection orifices is inserted inside airbag main body 13. Note that, various shapes of inflators are available, and it is also possible to employ a configuration in which a columnar main body is disposed inside airbag main body 13, for example.

The retainer is formed in a frame shape. The retainer includes an installation bolt (not illustrated) which is used for installing the inflator with airbag main body 13 (airbag 14) and formed in a protruding manner.

The cover member is formed integrally with or as a separate unit from installment panel 11 using a resin or the like. In the cover member, a tear line that is thinner than the other portion and easily breakable is formed in a flat shape similar to letter "H."

Figure 2:
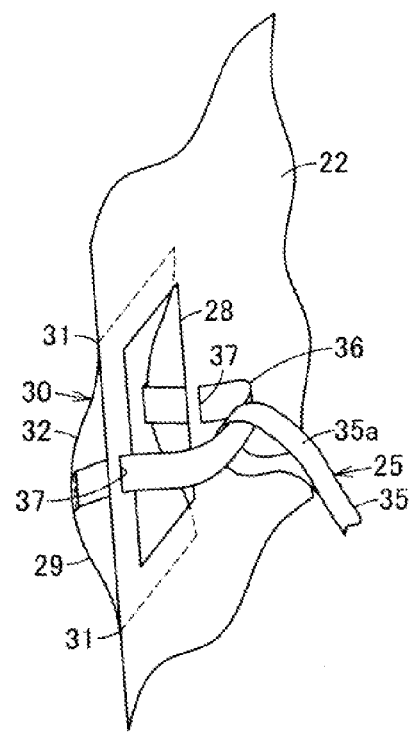
FIG. 2 is a perspective view illustrating a part of the airbag in an enlarged manner.
Figure 3:
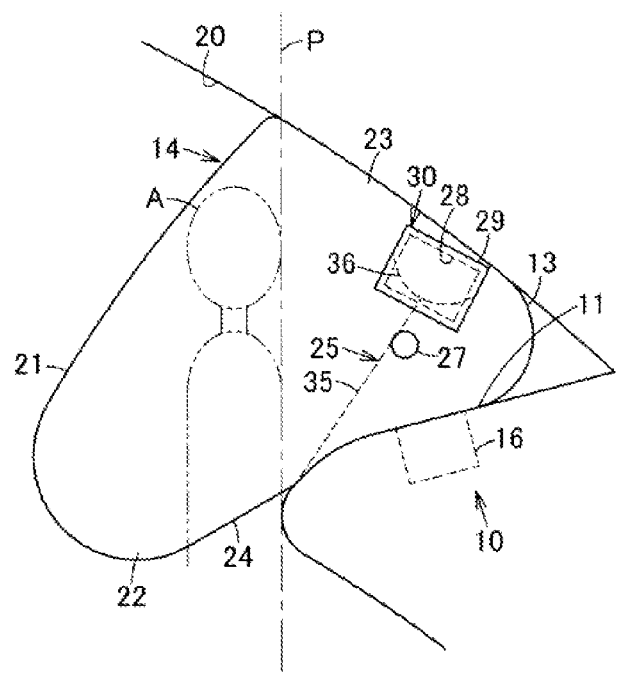
FIG. 3 is a side view illustrating a positional relationship between a connection member of the airbag and a passenger at an LRD evaluation position.

Airbag main body 13 illustrated in FIGS. 1 through 3 is formed in a sac-like shape as a whole by combining a single or multiple foundation cloths by sewing, adhesion, or welding, for example. Airbag main body 13 includes passenger restraining surface 21 at a rear end portion of airbag main body 13. Passenger restraining surface 21 extends in the up and down direction and the left and right direction (width direction) while facing passenger A when airbag main body 13 deploys (hereinafter, referred to as a "deployment state"). Lateral surfaces 22 are paired (first and second) opposite surfaces extending from two sides of passenger restraining surface 21 in a direction opposite to passenger A, in other words, extending forward in the front and rear direction and positioned opposite to each other in the left and right in a deployment state. Top surface 23 extends in the front and rear direction between the upper portions of passenger restraining surface 21 and lateral surfaces 22. Bottom surface 24 extends in the front and rear direction between the lower portions of passenger restraining surface 21 and lateral surfaces 22. Tethers 25, which serve as connection members, are attached inside airbag main body 13.

Passenger restraining surface 21 is positioned between lateral surfaces 22 and is a portion to restrain passenger A by providing a reaction force to passenger A moving forward. Passenger restraining surface 21 spreads in the up and down and left and right directions so as to have an area that covers the head, chest and belly portions of passenger A when airbag main body 13 deploys to the maximum extent.

Each lateral surface 22 is a so called side panel and is a surface portion that deploys with an outer surface directed toward the side direction in which lateral surface 22 does not directly face passenger A in a deployment state of airbag main body 13. Each lateral surface 22 includes circular vent hole 27, which allows a gas to be discharged, and variable vent hole 28, which is a square-shaped discharge hole. Vent hole 27 and variable vent hole 28 are formed at upper front side positions in the up and down direction, respectively. Covers 29 each being a lid serving as an opening and closing member to change the degree of opening (opening area) of corresponding variable vent hole 28 are attached to the outer sides of lateral side surfaces 22 at positions to be placed over variable vent holes 28, respectively. Cover 29, tether 25 and variable vent hole 28 thus form gas discharge mechanism 30.

Vent holes 27 and variable vent holes 28 are used for appropriately setting the internal pressure of airbag main body 13 by discharging a surplus amount of the gas introduced into airbag 14 (airbag main body 13). Each variable vent hole 28 is an opening positioned above vent hole 27, for example, and has a longitudinal direction along the front and rear direction and is set to have an opening area larger than vent hole 27. Note that, vent hole 27 is not a required configuration.

Each cover 29 may be called a valve sheet, for example. Each cover 29 is formed in a square-flap shape using a single or multiple foundation clothes, for example, and bonded to the outer portion of lateral surface 22 (airbag main body 13) over variable vent hole 28 by sewing or adhesion, for example. In the first embodiment, each cover 29 is attached to corresponding lateral surface 22 (airbag main body 13) over corresponding variable vent hole 28 in a short-side direction, that is, in the up and down direction. Accordingly, each cover 29 includes fixing portions 31, which are fixed to the outer portion of corresponding lateral surface 22 (airbag main body 13), at both edge portions of the cover, respectively. Cover main body 32, which is a lid main body serving as an opening and closing member main body, extends in an arch shape between fixing portions 31 so as to be spaced from corresponding lateral surface 22 (airbag main body 13). Cover main body 32 of each cover 29 is connected to tether 25. Thus, the degree of opening of each variable vent hole 28 changes when cover main body 32 is pulled in a direction approaching to lateral surface 22 (airbag main body 13) by tether 25. Thus, each variable vent hole 28 in the first embodiment opens and closes.

Top surface 23 is a portion facing windshield 20 and placed at a position opposite to and above lower surface 24 in a deployment state.

Lower surface 24 is formed in a shape in which to connect to passenger restraining surface 21 and lateral surfaces 22 while lower side portions of passenger restraining surface 21 and lateral surfaces 22 protrude downward, that is, to bulge downward. In addition, a gas introduction port (not illustrated) to supply a gas injected through the gas injection orifices of the inflator to the inside of airbag main body 13 is formed at a front side of lower surface 24, which is a position facing installment panel 11. Moreover, the circumferential portion of the gas introduction port is integrally fixed to the airbag housing portion of case body 16 together with the inflator.

Each tether 25 is also called a pull string, a belt, or a strap, for example. Each tether 25 is formed in a lengthy shape. The upper end of each tether 25, which is a first end of tether 25, is connected to cover 29 (cover main body 32) attached to a first one of lateral surfaces 22, and the lower end of tether 25, which is a second end of tether 25, is connected to a second one of lateral surfaces 22 in airbag main body 13. The second one of lateral surfaces 22 is positioned opposite to the first one of lateral surfaces 22 that includes variable vent hole 28 corresponding to cover 29 to which the first end of tether 25 is connected. Accordingly, tethers 25 are arranged in a shape so called cross tether in which tethers 25 cross each other in an X shape when viewed in the front and rear direction in airbag main body 13.

Each tether 25 is set to have a length so as to stretch to the maximum extent and thus to provide tension to cover 29 in the middle or last phase of deployment of airbag main body 13, that is, in a state where airbag main body 13 deploys at least to a predetermined extent. Accordingly, tethers 25 are configured to relax in a state where airbag main body 13 is folded (non-deployment state) or a state where passenger A is restrained. Each tether 25 integrally includes tether main body 35, which serves as a lengthy connection member main body, and connection portion 36, which is placed at the first end of tether main body 35. Each tether 25 is inserted through square (slit shape) through-holes 37, which are openings each formed at a position of lateral surface 22 (airbag main body 13) that is near variable vent hole 28, but is different from variable vent hole 28.

Tether main body 35 is formed in an elongated band shape by a foundation cloth, for example, and disposed linearly. The lower end of tether main body 35, which serves as the second end of tether 25, is connected to the inner side of lateral surface 22 (airbag main body 13) by sewing or the like, for example, and the upper end of tether main body 35 serves as loop portion 35a, which is formed in a loop shape by sewing or the like, for example, and connected to connection portion 36. Loop portion 35a is not fixed to connection portion 36, and connection portion 36 is inserted through the loop formed by loop portion 35a. Thus, loop portion 35a is freely movable along connection portion 36 between two ends of connection portion 36. The connection position of the lower end of tether main body 35 (tether 25) and lateral surface 22 is a position where lateral surface 22 extends to lower surface 24, that is, the lower end of lateral surface 22, and the position near airbag device 10 (so called out-of-position), for example; more specifically, the position where passenger A at a position of low risk deployment (LRD) defined by US regulations FMVSS208, that is, LRD evaluation position P (FIG. 3) and installment panel 11 (outer surface side) are in contact with each other. Stated differently, the lower end of tether main body 35 (tether 25) is connected to lateral surface 22 at a position that is spaced forward from passenger restraining surface 21 and that is a more rearward position than vent hole 27 and variable vent hole 28 (where lateral surface 22 extends to lower surface 24).

Connection portion 36 is disposed in a "U" shape in the width direction of tether main body 35, and a center portion of connection portion 36 is connected to tether main body 35 via loop portion 35a. The upper ends of connection portion 36, which correspond to the two ends of connection portion 36, are the first end of tether 25 and inserted through through-holes 37, respectively. More specifically, connection portion 36 is withdrawn to the outer side of airbag main body 13 while crossing variable vent hole 28 and is connected to the rear surface side (lower surface side) of cover 29 (cover main body 32), which faces variable vent hole 28, by sewing or the like, for example, at positions near the two ends of cover 29 (cover main body 32) in a short-side direction of cover 29.

In the first embodiment, a pair of through-holes 37 is formed for each variable vent hole 28. For example, through-holes 37 are formed in lateral surface 22 (airbag main body 13) at two positions located opposite to each other in the direction of the two ends of variable vent hole 28 in the short-side direction, i.e., two positions located opposite to each other in the up and down direction and spaced from the two ends of variable vent hole 28, respectively. The width dimension of each through-hole 37 is set substantially equal to the width dimension of connection portion 36. Thus, through-holes 37 regulate the positions of connection portion 36 (tether 25) in the width direction.

Next, a description will be given of deployment behavior of airbag device 10.

The outline of an operation of airbag device 10 is as follows. The controller activates the inflator in a collision of an automobile, for example, and when the inflator injects a gas, airbag main body 13 housed in the airbag housing portion in a folded state inflates and deploys in association with flow of the gas through the gas introduction port and breaks the tear line of the cover member and protrudes from the rectangular opening for protrusion and deploys toward passenger A.

Figure 4A:
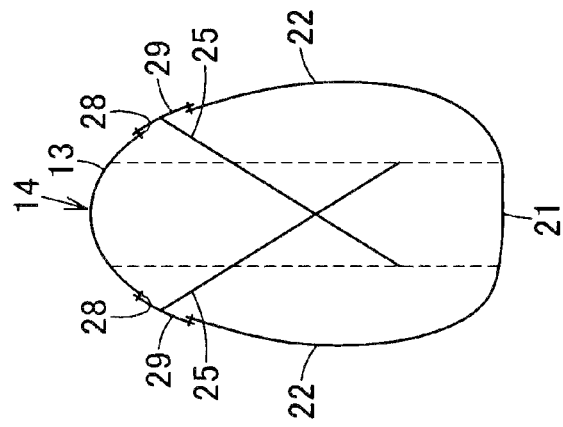
FIGS. 4A and 4C are explanatory diagrams schematically illustrating deployment behavior during normal deployment of the airbag sequentially from FIGS. 4A to 4C.

More details will be given below. Each tether 25 is relaxed in a folded state of airbag main body 13. For this reason, in the initial phase of normal deployment, upon introduction of a gas into airbag main body 13 from the inflator, airbag main body 13 starts inflating in the up and down, left and right and front and rear directions, so that tethers 25 having the lower ends that are connected to lateral surfaces 22 in a relaxed state are pulled and gradually stretched. Note that, even while each tether 25 is stretched, each vent hole 28 is opened (FIG. 4A).

Figure 4B:
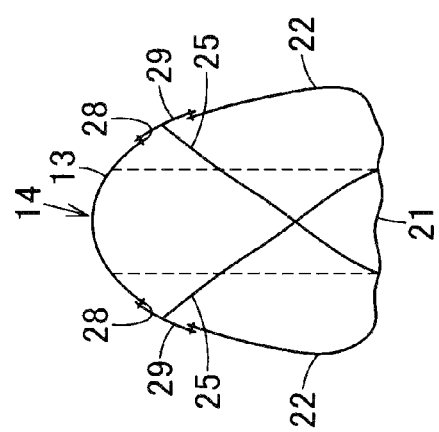

In the middle phase of deployment, when tethers 25 are further pulled by lateral surfaces 22, the tension of X-shaped crossing tethers 25 increases, so that the two ends of each cover 29 (cover main body 32) connected to corresponding tether 25 are gradually pulled toward corresponding lateral surface 22 of airbag main body 13. Thus, the degree of opening of each variable vent hole 28 becomes small, and the two ends of each cover 29 are brought into close contact with airbag main body 13 (corresponding lateral surface 22), thus, making the degree of opening of each variable vent hole 28 relatively small, that is, closing the opening of each variable vent hole 28 in the first embodiment (FIG. 4B).

Figure 4C:
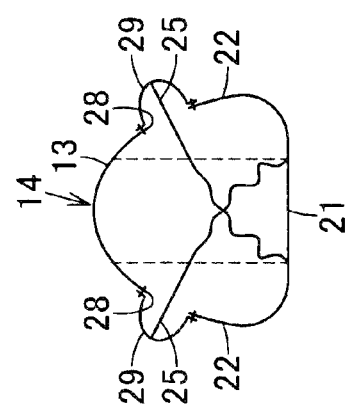

In the last phase of deployment in which back stroke increases, the closed state of each variable vent hole 28 (the state where the degree of opening is relatively small) is kept, and only each vent hole 27 is opened in this state. Thus, the internal pressure of airbag main body 13 is kept relatively high (FIG. 4C).

Let us consider a case where passenger A at a position closer to airbag device 10 (installment panel 11) than a normal position, e.g., passenger A such as an adult or child at a non-normal position (out-of-position (OOP)), that is, passenger A at evaluation position P of LDR according FMVSS208 regulations is brought into contact with passenger restraining surface 21 in the middle phase of deployment (see, FIGS. 5A and 5B), for example. In this case, the belly portion or head portion of passenger A in contact with the lower end of each tether 25, that is, the connection portion of each tether 25 with respect to corresponding lateral surface 22 in contact with passenger A causes each tether 25 to relax, thus reducing the tension of each tether 25. Thus, each tether 25 no longer pulls corresponding cover 29, so that the opened state of each variable vent hole 28 is kept. Thus, the gas is appropriately discharged from each vent hole 27 and each variable vent hole 28 to the outer side of airbag main body 13. Accordingly, the internal pressure of airbag main body 13 is kept relatively low, and passenger A can be surely protected with an appropriate amount of pressure.

Figure 6:
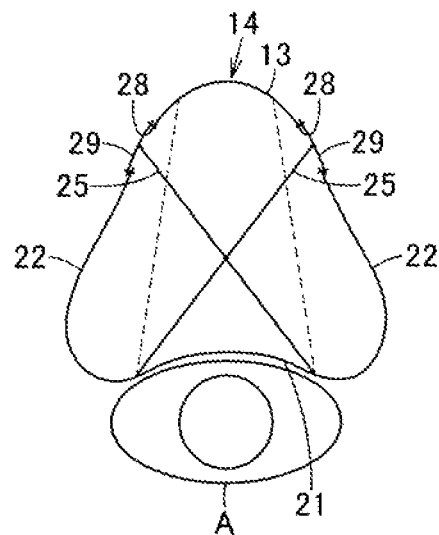
FIG. 6 is a plan view schematically illustrating deployment behavior of the airbag main body when the passenger of the airbag is positioned at a normal position.

Meanwhile, when passenger A at the normal position is restrained at passenger restraining surface 21 while variable vent holes 28 are closed by covers 29 in the last phase of deployment, pushing against passenger restraining surface 21 by passenger A causes airbag main body 13 to inflate in the left and right direction, that is, the lateral direction in which two lateral surfaces 22 are spaced from each other. Thus, the tension of each tether 25 having the lower end that is connected to facing lateral surface 22 is kept. For this reason, the closing force for each variable vent hole 28 increases because of corresponding cover 29, so that the closed state of each variable vent hole 28 is kept, and the internal pressure of airbag main body 13 is kept relatively high. Thus, passenger A can be surely protected with an appropriate amount of pressure (FIG. 6).

As described above, according to the first embodiment, the first end (upper end) of tether 25 is connected to cover 29 attached to the outer portion of airbag main body 13 of discharging variable vent hole 28 formed in at least one (first one) of paired lateral surfaces 22 facing each other, e.g., in both paired lateral surfaces in this embodiment, while the second end (lower end) of tether 25 is connected in airbag main body 13 to a second one of lateral surfaces 22 which is positioned opposite to the first one of lateral surfaces 22 that includes variable vent hole 28 corresponding to cover 29. Thus, the degree of opening of variable vent hole 28 can be stably and easily adjusted with a simple configuration because tether 25 is pulled by lateral surface 22 in accordance with inflation and deployment of airbag main body 13 and thus provides tension to cover 29, regardless of the physical size of passenger A restrained at passenger restraining surface 21 positioned between paired lateral surfaces 22 and/or an input angle for restraint.

More specifically, when passenger A is restrained (inputted) to passenger restraining surface 21 in a configuration in which the second end of tether 25 is connected to passenger restraining surface 21, a too much gas may be discharged from variable vent hole 28 in an opened state. This is because the tension of tether 25 is reduced because of a reduction in the distance between the first and the second ends of tether 25, and the closed state of variable vent hole 28 is not kept by cover 29. For this reason, connecting tether 25 to lateral surface 25 where passenger A is not restrained makes it possible to stably keep the closed state of variable vent hole 28 with cover 29 without being affected by the restraining position of passenger A or the like.

Moreover, setting the connection position of tether 25 with lateral surface 25 at a position where tether 25 is in contact with evaluation position P of LRD according to FMVSS208 regulations and installment panel 11 causes tether 25 to relax and not to provide tension to cover 29 when passenger A is restrained at a position close to installment panel 11. Thus, variable vent hole 28 is opened, and passenger A can be restrained while the internal pressure of airbag main body 13 is suppressed in this case. Thus, airbag 14 according to the first embodiment can satisfy the LRD performance. Moreover, adjusting the connection position of tether 25 (tether main body 35) with respect to lateral surface 22 makes it possible to easily set the positions that opens and that closes variable vent hole 28. Thus, this configuration involves no increase in costs or weight.

Accordingly, it is made possible to achieve both the closed state of variable vent hole 28 in restraining passenger A at the normal position and the opened state of variable vent hole 28 in restraining passenger A at the out-of-position (at LRD evaluation position P) near airbag device 10 (airbag 14), which satisfies both the passenger restraining performance by airbag 14 and the LRD performance.

In the first embodiment, the two ends of connection portion 36 are connected to cover 29 while crossing variable vent hole 28, and the first end (loop portion 35a) of tether main body 35 is connected movably along connection portion 36, while the second end of tether main body 35 is connected to lateral surface 22. Thus, regardless of the angle at which tether main body 35 is pulled according to a deployment shape of airbag main body 13, the first end (loop portion 35a) of tether main body 35 can move along connection portion 36 and keep the connection with connection portion 36. Furthermore, the first end of tether main body 35 moves along connection portion 36 and can pull connection portion 36 at an appropriate position where tension can be surely provided to cover 29. For this reason, tension can be surely provided to cover 29 via connection portion 36, which makes it possible to pull cover 29 in a well balanced manner.

Figure 7:
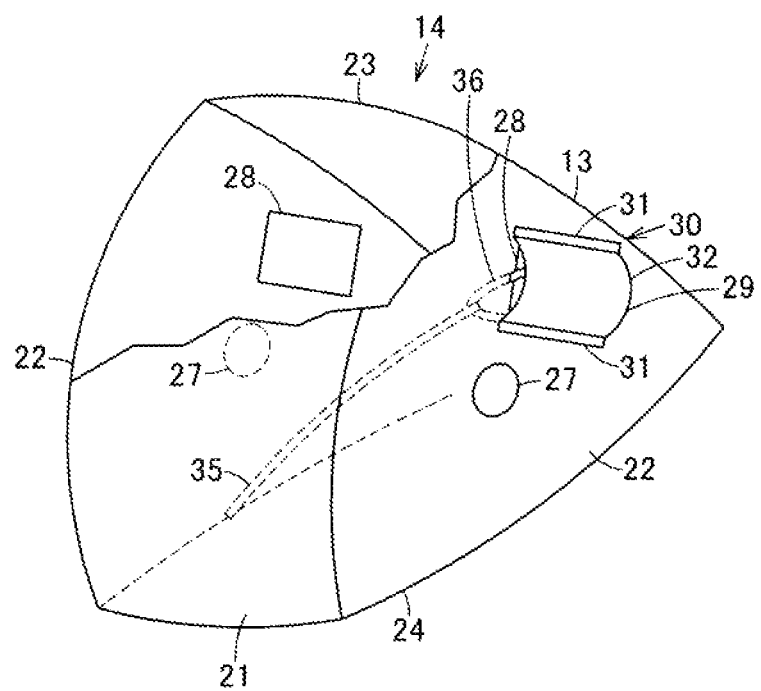
FIG. 7 is a perspective view illustrating from rearward an airbag according a second embodiment of the present invention.

Note that, in the first embodiment, cover 29 may be attached only to an outer portion of airbag main body 13 of variable vent hole 28 formed in one of lateral surfaces 22 among variable vent holes 28 formed in lateral surfaces 22, as in a second embodiment illustrated in FIG. 7. In this configuration, the degree of opening of variable vent hole 28 can be stably and easily adjusted with a simpler configuration.

Figure 8:
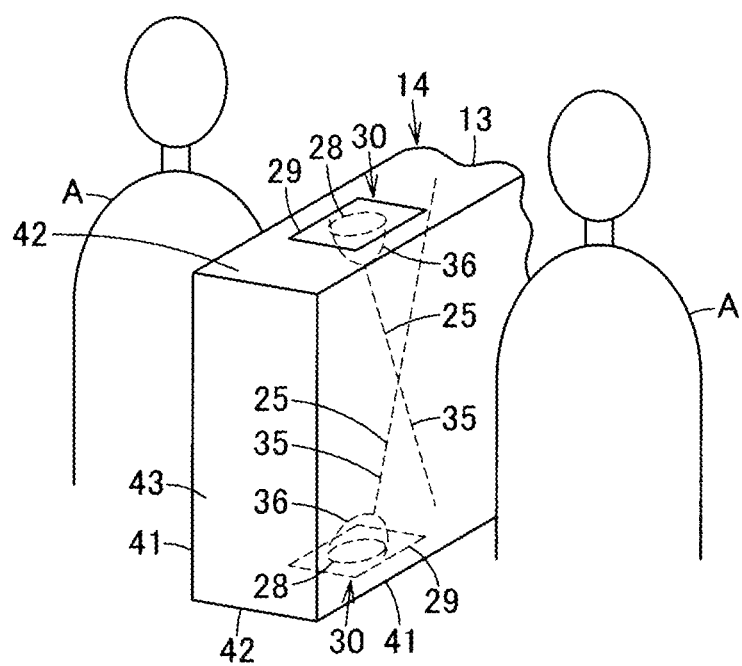
FIG. 8 is a perspective view illustrating from forward an airbag according a third embodiment of the present invention.

Next, a description will be given of a third embodiment with reference to FIG. 8. Note that, the same components and operational effects as those of the first embodiment are assigned the same reference numerals, so that the descriptions of the same components and operational effects will not be repeated, hereinafter.

Airbag 14 according to the third embodiment is applied to a side airbag device (far-side airbag device) configured to deploy between a driver seat and a front-passenger seat.

Airbag main body 13 of airbag 14 is housed in a folded state in a case body disposed at a rear portion of the driver seat or front-passenger seat, for example. Airbag main body 13 includes passenger restraining surfaces 41 at left and right side positions where passenger restraining surfaces 41 face passengers A seated on the driver seat and front-passenger seat, respectively, in a deployment state. In addition, airbag main body 13 includes paired opposite surfaces 42, which extend in the front and rear direction at upper and low positions, respectively, between passenger restraining surfaces 41 so as to be positioned opposite to each other in the up and down direction in a deployment state. Front surface 43 extends in the up and down direction between front ends of passenger restraining surfaces 41 and opposite surfaces 42. Meanwhile, a rear surface (not illustrated) extends in the up and down direction between rear ends of passenger restraining surfaces 41 and opposite surfaces 42. Opposite surfaces 42 include variable vent holes 28 and covers 29, respectively.

Each passenger restraining surface 41 is positioned between opposite surfaces 42 and is a portion to restrain passenger A by providing a reaction force to passenger A moving, laterally. Each passenger restraining surface 41 expands in the up and down and front and rear directions so as to have an area that covers an upper body of passenger A when airbag main body 13 deploys to the maximum extent.

Each opposite surface 42 is a surface portion that deploys with an outer surface directed toward the up and down direction in which opposite surface 42 does not directly face passenger A in a deployment state of airbag main body 13.

A first end (connection portion 36) of each tether 25 is connected to corresponding cover 29 corresponding to a first one of opposite surfaces 42. A second end of each tether 25 (tether main body 35) is connected in airbag main body 13 to a second one of opposite surfaces 42 which is positioned opposite to the first one of opposite surfaces 42 that includes variable vent hole 28 corresponding to cover 29 to which the first end (connection portion 36) of tether 25 is connected. Accordingly, tethers 25 are arranged in an X shape in which tethers 25 cross each other when viewed in the left and right direction in airbag main body 13.

As described above the first end of tether 25 is connected to cover 29 attached to the outer portion of airbag main body 13 of discharging variable vent hole 28 formed in at least one of paired opposite surfaces 42 facing each other, e.g., in both of paired opposite surfaces 42 in this embodiment, while the second end of tether 25 is connected in airbag main body 13 to the second one of opposite surfaces 42 which is positioned opposite to the first one of opposite surfaces 42 that includes variable vent hole 28 corresponding to cover 29 to which the first end of tether 25 is connected. Thus, the degree of opening of variable vent hole 28 can be stably and easily adjusted with a simple configuration because tether 25 is pulled by opposite surface 42 in accordance with inflation and deployment of airbag main body 13 and thus provides tension to cover 29, regardless of the physical size of passenger A restrained at passenger restraining surface 41 positioned between paired opposite surfaces 42 and/or an input angle for restraint. Stated differently, the same operational effects achieved in each of the first and the second embodiments can be brought about.

Note that, in the third embodiment, cover 29 may be provided for only variable vent hole 28 formed in one of opposite surfaces 42 as in the second embodiment.

A vent hole that is different from variable vent hole 28 may be formed in opposite surface 42.

Moreover, in each of the embodiments, the connection portion of tether 25 (tether main body 35) with respect to lateral surface 22 or opposite surface 42 is optionally changeable depending on the required performance (deployment characteristics).

Tether 25 may be directly connected to cover 29 (cover main body 32), for example, via variable vent hole 28, without crossing variable vent hole 28. In this configuration, when tether 25 is pulled by lateral surface 22 or opposite surface 42, cover 29 is directly pulled onto variable vent hole 28, so that variable vent hole 28 can be more surely closed.

INDUSTRIAL APPLICABILITY

The present invention is favorably used as, for example, a front-passenger seat airbag to be installed at an installment panel.

REFERENCE SIGNS LIST

13 Airbag main body
14 Airbag
21, 41 Passenger restraining surface
22 Lateral surface serving as opposite surface
25 Tether serving as connection member
28 Variable vent hole serving as discharge hole
29 Cover serving as lid
35 Tether main body serving as connection member main body
36 Connection portion
42 Opposite surface
A Passenger

The invention claimed is:

1. An airbag comprising:
an airbag main body including:
paired opposite surfaces facing each other, the paired opposite surfaces being lateral surfaces, each of which deploys with each outer surface directed toward a side direction in which the paired opposite surfaces do not directly face a passenger in a deployment state of the airbag main body, and
a passenger restraining surface that is positioned between the paired opposite surfaces while facing the passenger and that is capable of restraining the passenger, the airbag main body having a sac-like shape and being configured to inflate and deploy from a folded state by an introduced gas;

a discharge hole included in at least one of the paired opposite surfaces;

a lid attached to a position of an outer portion of the airbag main body to be placed over the discharge hole; and a connection member including a first end and a second end, the first end being connected to the lid corresponding to a first one of the paired opposite surfaces, the second end being directly connected to an inner side of a second one of the paired opposite surfaces that is positioned opposite to the first one of the paired opposite surfaces which includes the discharge hole corresponding to the lid, without intervention of any other member, in an inner surface side of the airbag main body, wherein the connection member is directly pulled by the second one of the paired opposite surfaces in accordance with inflation and deployment of the airbag main body to provide tension to the lid, thereby changing the degree of opening of the discharge hole.

2. The airbag according to claim 1, wherein the connection member further includes:

a connection portion having two ends that are connected to the lid while crossing the discharge hole, the two ends of the connection portion being the first end of the connection member; and a connection member main body having a first end and a second end, the first end of the connection member main body being connected to the connection portion movably along the connection portion, the second end of the connection member main body being the second end of the connection member and being connected in the airbag main body to the second one of the paired opposite surfaces that is positioned opposite to the first one of the paired opposite surfaces.

* * * * *